June 25, 1968 R. S. WITTE ET AL 3,390,268
ELECTRICAL APPARATUS FOR SIMULATING THE OPTICAL STIMULATION
OF A MEDIUM AND COMPUTING CHARACTERISTIC
LIFE-TIMES OF SAID MEDIUM
Filed Sept. 30, 1965 2 Sheets-Sheet 2

Robert S. Witte,
Richard C. Mackey,
INVENTOR.

BY.

Jerry G. Dinardo

AGENT.

United States Patent Office 3,390,268
Patented June 25, 1968

---

3,390,268
ELECTRICAL APPARATUS FOR SIMULATING THE OPTICAL STIMULATION OF A MEDIUM AND COMPUTING CHARACTERISTIC LIFE-TIMES OF SAID MEDIUM
Robert S. Witte, Redondo Beach, and Richard C. Mackey, Reseda, Calif., assignors to TRW Inc., Redondo Beach, Calif., a corporation of Ohio
Filed Sept. 30, 1965, Ser. No. 491,607
7 Claims. (Cl. 250—71)

This invention relates to wave analyzing apparatus, and more particularly to apparatus for analyzing the time depending physical characteristics of a medium. The invention is useful in measuring the lifetimes of fluorescent or electroluminescent media or the photoconductive response of photoconductive materials, for example.

In the study of fluorescent lifetimes that are comparable to the pulse width of the excitation, analytical determination of the lifetimes from the observed time behavior of the fluorescence is a difficult procedure even in cases when the physical rates are such that the fluorescence behavior may be characterized by a single lifetime.

This invention is based on the realization that certain time varying physical response characteristics, brought about in a medium by subjecting the atoms thereof to change in energy states, can be measured through the use of simple analog computer circuits. The analog computer circuits are designed to simulate the waveforms both of the exciting energy which subjects the atoms of the medium to change in energy states and of the response characteristics of the excited medium. Predetermination of the circuit parameters of the analog computer circuits allows a determination of the unknown time varying characteristic being measured.

In the drawing:

FIGURE 2b is a graph, reproduced from an actual oscilloscope trace, of waveforms of the electrical analogs of the system that resulted in the waveforms of FIGURE 2a;

Figure 1:
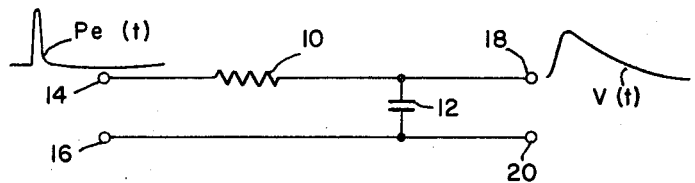
FIGURE 1 is a schematic of an electrical circuit which is the analog of an atomic system whose behavior is described by a linear first order differential equation.

Consider the simplest case of a resonant fluorescence excited in atoms of an optically thin sample by illuminating it with a light pulse which can be expressed mathematically by some function $P(t)$. The linear first order differential equation which the intensity of fluorescence $I(t)$ will approximately obey is:

$$dI(t)/dt + I(t)/\tau = P(t) \qquad (1)$$

where $\tau$ is the radiative lifetime of the fluorescing state. The electrical circuit which is an analog of the atomic system whose behavior is described by Equation 1 is shown in FIGURE 1. An integrating network including a resistor 10 having a value R and capacitor 12 having a value C are connected in series across input terminals 14 and 16. Output terminals 18 and 20 are connected across the capacitor 12. If a pulse of voltage $Pe(t)$ is applied across input terminals 14 and 16 then the variation of voltage $V(t)$ across output terminals 18 and 20 will follow an equation similar to Equation 1 in which $\tau$ is replaced by RC, namely, $$\frac{dV(t)}{dt} + \frac{V(t)}{RC} = \frac{Pe(t)}{RC}$$

Figure 2A:
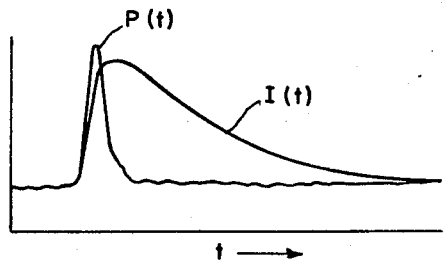
FIGURE 2a is a graph, reproduced from an actual oscilloscope trace, showing the waveform of a light pulse for exciting fluorescence in a fluorescent sample and the waveform of the fluorescent light.
Figure 2B:
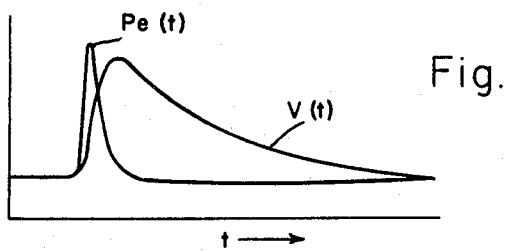

Here $V(t)$ is analogous to $I(t)$ the intensity of the fluorescing state and $Pe(t)$ is related to $P(t)$ by a scale factor. Thus by displaying the fluorescence and voltage decay curves on an oscilloscope and adjusting the values of R and C so that the traces representing $V(t)$ and $I(t)$ coincide, the decay time of fluorescence can be determinated from the RC product or electrical time constant. FIGURE 2b shows the output of such an analogous circuit wherein the values of R and C have been adjusted so that the traces in FIGURE 2b match the real data shown in FIGURE 2a.

Figure 3:
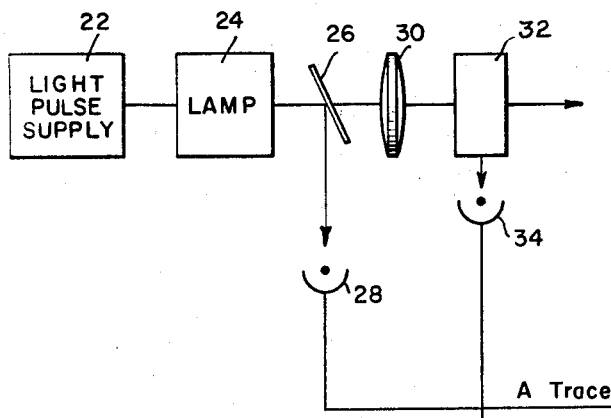
FIGURE 3 is a schematic diagram of apparatus for measuring the fluorescence lifetime in accordance with the invention.
Figure 3:
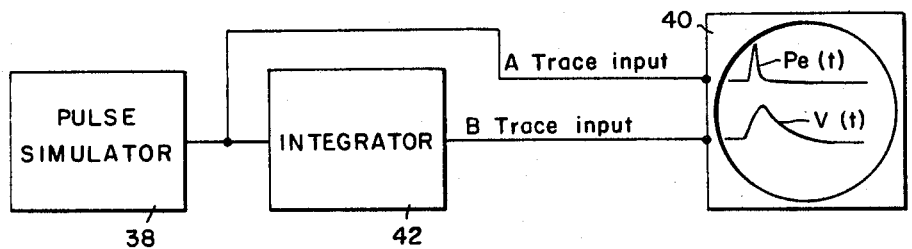

FIGURE 3 shows a schematic diagram of one form of apparatus employing a computer in accordance with the invention for measuring fluorescence lifetime in a fluorescent material. A light pulse supply 22 furnishes a train of voltage pulse for exciting a light source or gas lamp 24 to cause it to emit short duration light pulses. The light source 24 is capable of emitting high repetition rate light pulses having a duration of 10 to 20 nanoseconds with rise and fall times of 1 to 3 nanoseconds. The light pulses have a line spectrum, the exact wave length of which depends on the type of gas used. A hydrogen or deuterium filled lamp emits light in the spectral range of 2000 to 4000 angstroms wave length, while a nitrogen-oxygen filled lamp has an emitting wave length in the spectral range of 3000 to 4500 angstroms.

The light emitted by the light source 24 strikes a beam splitter 26 which sends part of the light rays to a first photo cell 28. The other part of the rays are sent to an optical system 30 which direct the rays to a fluorescent sample 32, whose fluorescence lifetime is to be measured. The fluorescent light emitted by the sample 32 is picked up by a second photocell 34. The outputs of the first and second photocells 28 and 34 are fed to a first oscilloscope 36 to produce A and B traces. The A trace, $P(t)$, is a waveform representing the intensity versus time characteristic of the pulsed light source, while the B trace, $I(t)$, represents the intensity versus time characteristics of the fluorescence emission of the fluorescent sample. As an example, the time scale of the A and B traces on the oscilloscope may be 0.1 microsecond per centimeter. However, in some instances it may prove desirable to have trace A operating at a different sweep rate from trace B.

It is often desired to accurately measure the lifetime of fluorescence, such as that associated with the B trace above. In accordance with the invention an analog computer circuit is arranged to simulate the light pulse and fluorescent light waveforms. An electrical signal is first generated in a pulse simulator 38 to simulate the light pulse, and the simulation pulse Pe(t) is displayed by a second oscilloscope 40 on the A trace. The simulation pulse is passed through a computer or integrator 42 to integrate the pulse and provide a pulse which simulates the fluorescent light pulse. The simulated fluorescent pulse V(t) is applied to the second oscilloscope 40 and displayed on the B trace. Circuit parameters are adjusted in the pulse simulator 38 and the integrator 42 until the A and B traces on the second oscilloscope 40 match the corresponding A and B traces on the first oscilloscope 36.

The time scale on the second oscilloscope 40 is preferably longer than that of the first oscilloscope 36, and may be, for example, 100 microseconds per centimeter. The reason for this is that more flexibility is obtained in the computer circuitry with standard components. To work on a real time basis, the short times involved would require the use of small circuit components, and the circuit would be extremely sensitive to circuit layout. Furthermore, where many stages are required in more complicated systems, isolation problems would increase.

Through a simple calculation involving the circuit parameters in the integrator 42 and a factor related to the time scales of the two oscilloscopes 36 and 40, the lifetime of the fluorescence may be determined.

Figure 4:
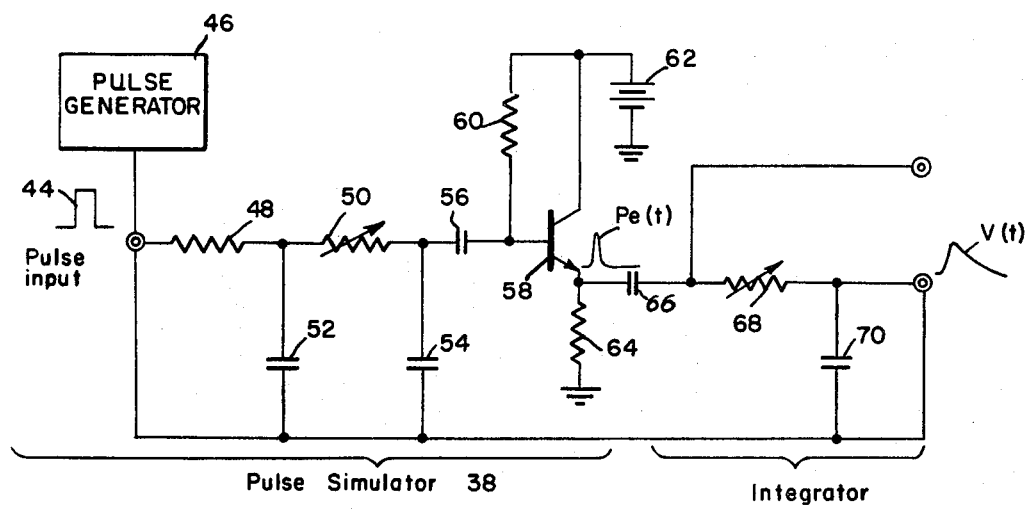
FIGURE 4 is a schematic diagram of a light pulse simulator and analog computer according to the invention.

Referring in more detail to FIGURE 4, rectangular pulses 44 from a pulse generator 46 are applied to a pulse shaping filter network including series resistors 48 and 50 and shunt capacitors 52 and 54. The output of the filter is coupled through a capacitor 56 to the base of an NPN transistor 58 which serves as an isolation amplifier between the previously described filter network and the following integrator stage. The base is connected through a resistor 60 to a positive direct current voltage supply 62. The collector is connected to the supply 62. The emitter is connected through a resistor 64 to ground, thus forming an emitter follower connection.

The electrical pulse Pe(t) taken off the emitter is a replica of the light pulse described above. The electrical pulse may be shaped by adjusting the circuit parameters, such as the variable resistor 50 and/or the width of the applied pulse 44 until the simulation pulse Pe(t) matches the excitation light pulse P(t).

The simulation pulse is coupled through a capacitor 66 to an integrator network including a series resistor 68 and shunt capacitor 70. The output taken across the capacitor 70 constitutes the simulated fluorescence pulse V(t). The circuit parameters of the integrator, such as the variable resistor 68, may be adjusted so that the simulated pulse across the capacitor 70 matches the fluorescent light pulse.

To calculate the fluorescent lifetime, the product is first taken of the resistor 68 and capacitor 70 in the integrator. The RC product is then multiplied by a conversion factor which is the ratio of the time scales of the first and second oscilloscopes. In the example given above the conversion factor is $\frac{1}{1000}$.

To compare the traces on the two oscilloscopes, a photograph may first be taken of the traces on the first oscilloscope 36, and a transparency made. The transparency may be placed on the second oscilloscope 40 and the traces thereon caused to match those in the transparency.

Alternatively, matching of the two sets of traces may be accomplished by using a dual beam oscilloscope in combination with a dual channel preamplifier. One beam may be used to trace either the light pulse of the fluorescent pulse selectively, and the other beam to trace either the simulated light pulse or the integrated pulse selectively. The two chosen pulses may be matched by moving the beams and making the appropriate parameter adjustments until the beams coincide.

The circuit diagram of FIGURE 4 may be used to measure fluorescence in atomic systems having a single lifetime response, such as in a 2-level atomic system, or in a 3-level system in which the fluorescence lifetime $\tau_1$ between upper and intermediate levels is much shorter than the fluorescence lifetime $\tau_2$ between the intermediate and lower levels. In systems where $\tau_1$ is comparable to $\tau_2$, however, a computer may be used which includes a number of cascaded integrators, with isolation amplifiers connected between the integrator stages.

Figure 5:
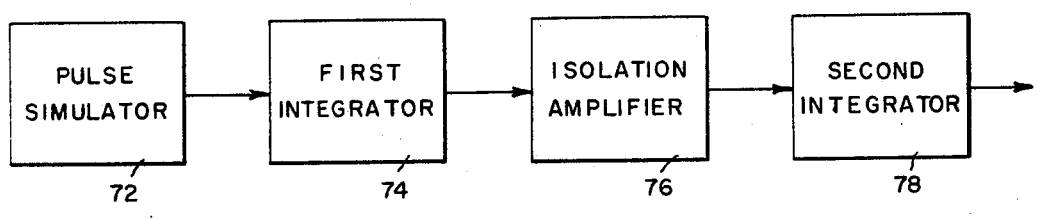
FIGURE 5 is a block diagram of apparatus for measuring fluorescent lifetime in a 3-level atomic system.

A block diagram of such an arrangement is shown in FIGURE 5. Referring to FIGURE 5, the output of a pulse simulator 72 is fed to a first integrator 74, next to an isolation amplifier 76, and then to a second integrator 78. The circuit constants of the two integrators 74 and 78 may be adjusted independently, without feedback, through the use of the isolation amplifier 76. The RC products are computed as previously described for each integrator stage, with each RC product corresponding to the lifetimes $\tau_1$ and $\tau_2$ respectively of the three level system.

The embodiments of the invention in which an exclusive property or privilege is claimed are defined as follows:

1. In apparatus for analyzing the time dependent physical characteristics of a medium, the combination of:
    means for supplying time varying excitation energy to a medium to effect a change in atomic states of the medium which causes the medium to exhibit a physical response having a time dependent characteristic that is a function of said excitation energy;
    means for converting the physical response of said medium to a first electrical signal having a waveform corresponding to the physical response;
    means for generating a second electrical signal having a waveform simulating that of said time varying excitation energy; and
    means for integrating said second electrical signal to develop a simulated waveform matching the waveform of said first electrical signal.

2. The invention according to claim 1, wherein said means for generating said second electrical signal includes circuit parameters calculated to produce a waveform simulating said time varying excitaition energy on an expanded time scale.

3. The invention according to claim 1, wherein the means for generating said second electrical signal and the means for integrating said second electrical signal include circuit parameters which are adjustable to cause the corresponding waveforms to match the waveforms simulated thereby.

4. In apparatus for analyzing the time dependent physical characteristics of a medium, the combination of:
    means for supplying time varying excitation energy to a medium to effect a change in atomic states of the medium which causes the medium to exhibit a physical response having a time dependent characteristic that is a function of said excitation energy;
    means for converting the physical response of said medium to a first electrical signal having a waveform corresponding to the physical response;
    means for generating a second electrical signal having a waveform simulating that of said time varying excitation energy;
    means for integrating said second electrical signal to develop a simulated waveform matching the waveform of said first electrical signal; and
    means for comparing the waveform of said second electrical signal with that of said time varying excitation energy and for comparing said simulated waveform with that of said first electrical signal.

5. Apparatus for measuring the fluorescent lifetime of a fluorescent material, said apparatus comprising:
    means for irradiating a fluorescent material with pulsed light to cause said material to emit fluorescent light of given response characteristics;
    means for converting said fluorescent light to a first electrical signal having a waveform corresponding to said response characteristics;

means for generating a second electrical signal having a waveform simulating that of said pulsed light; and means for integrating said second electrical signal to develop a simulated waveform matching that of said first electrical signal.

6. The invention according to claim 5 wherein the means for generating said second electrical signal includes means for generating a rectangular voltage pulse, and a filter network coupled to said rectangular voltage pulse generating means.

7. The invention according to claim 5, wherein said integrating means includes a first integrator, an isolation amplifier coupled to said first integrator, and a second integrator coupled to said isolation amplifier.

References Cited
UNITED STATES PATENTS 2,587,919  3/1952  Straus et al. _____ 235—184
3,180,988  4/1965  Burkhardt et al. _____ 250—71

RALPH G. NILSON, *Primary Examiner.*

M. ABRAMSON, *Assistant Examiner.*